Patented Feb. 5, 1935

1,989,759

UNITED STATES PATENT OFFICE 1,989,759

CHLORINATED ALKALINE SILICATE

Paul Logue, Birmingham, and William N. Pritchard, Jr., Anniston, Ala., assignors to Swann Research, Inc., a corporation of Alabama No Drawing. Application June 22, 1931, Serial No. 546,150

2 Claims. (Cl. 87—5)

This invention relates to chlorine containing alkali silicates and particularly to solid or liquid sodium silicates containing available chlorine.

An object of this invention is the production of improved detergent compositions containing alkaline silicates. Another object is the production of sodium silicate detergents having combined cleaning and disinfecting properties.

Our invention may be applied to any alkali silicate whether in the liquid or solid form and irrespective of the alkali content. We, however, prefer to use in the practice of our invention particularly the solid sodium silicates, especially those having ratios of soda to silica equivalent to the meta and ortho silicates.

The production of sodium meta and ortho silicates, such as we may use in the preparation of our improved detergent, has recently been carried out by the following processes.

(a) By mixing together a low alkali ratio silicate and finely divided caustic soda so that the product contains 1 mol. of $Na_2O$ to every mol. of $SiO_2$. To this composition may be added soda ash and trisodium phosphate to further enhance its usefulness as a cleaning agent. The dry particles containing sodium metasilicate may be sprayed with a small amount of oleic acid to improve its keeping qualities.

(b) By combining a sodium metasilicate with caustic soda and forming the composition into granules by mechanical kneading. The silicates made in accordance with this process are more alkaline than the metasilicate, that is having a ratio of $Na_2O$ to $SiO_2$ substantially equal to or greater than 1 to 1 and up to and including a ratio of 2 to 1 of these constituents.

By way of illustrating one method of practicing our invention we may proceed as follows:

A mass of solid granular sodium silicate which has been prepared as above mentioned is exposed to the action of chlorine gas. This may be done in any convenient device such as a rotating drum in which the solid is continuously agitated due to the motion of the drum and thus exposed to the action of the gas. Since considerable heat is developed due to the reaction of chlorine with the silicate it is desirable to cool the exterior of the drum by means of cold water. Chlorination in this manner is continued until say from 1 to 6 or more percent of chlorine, determined as available chlorine, has been absorbed. The product thus produced may be stored in tight drums or containers until used.

In place of treating the solid granular sodium silicate alone, we may treat the product which has had incorporated into it either soda ash or trisodium phosphate or both these ingredients. Such a product has been found to possess improved detergent properties. In producing these products it may be desirable to coat the chlorinated product with oleic acid. Such treatment may be carried out either before or after chlorination.

It is desirable when chlorinating the above described solid sodium silicates to maintain the temperature below the melting point of the silicate being chlorinated. Both the metasilicate and the higher alkali silicates melt at temperatures in the neighborhood of 60° C., hence the temperature is preferably maintained below this point during chlorination.

We may accordingly dilute the chlorine with air or other inert gas in carrying out the process. When so diluted with an inert gas, heat is liberated slowly, thus preventing the solid particles from melting together.

Another type of silicate which may be chlorinated is the liquid variety, known as water glass. When the alkali content of such a silicate is low, for example when it contains in the neighborhood of 0.25 $Na_2O$ to 1 mol. of $SiO_2$, precipitation of silica occurs. We have found, however, that the precipitate is particularly retentive of chlorine. Hence for this purpose it is of considerable value. Altho such a precipitate is not water soluble per se, we have found by the addition of a small amount of caustic it can be brought into solution without impairment of available chlorine. If desired, caustic may be added before or after chlorination. This application therefore contemplates methods of production of alkaline silicates containing available chlorine both by chlorination of the liquid and solid silicates, containing from 0.25 mol. of $Na_2O$ to 1 mol. of $SiO_2$ up to and including 2 mols. of $Na_2O$ to 1 of $SiO_2$.

Products thus produced are useful for general detergent and disinfecting purposes, for example as for incorporation into soaps or soap builders.

While we have described our invention in several forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What we claim is:

1. The method of producing a detergent which consists in combining sodium silicate with caustic soda to obtain a product having a ratio of $Na_2O$ to $SiO_2$ between the limits of 1 to 1 and 2 to 1, kneading the composition to form dry granules, incorporating trisodium phosphate into the granular mass, exposing the composition while in a dry state to the action of chlorine gas, and coating the chlorinated product with oleic acid.

2. The method of producing a detergent which consists in combining sodium meta silicate with caustic soda to obtain a product having a ratio of $Na_2O$ to $SiO_2$ between the limits of 1 to 1 and 2 to 1, kneading the composition to form a dry granular mass, incorporating trisodium phosphate into the granular mass, exposing the dry composition to the action of chlorine gas until from 1 to 6% of available chlorine has been absorbed, and coating the particles with oleic acid.

PAUL LOGUE.
WILLIAM N. PRITCHARD, Jr.